US012649327B2

(12) United States Patent
Imamura

(10) Patent No.: US 12,649,327 B2
(45) Date of Patent: Jun. 9, 2026

(54) PRINTING DEVICE AND PRINTING METHOD

(71) Applicant: SEIKO EPSON CORPORATION, Tokyo (JP)

(72) Inventor: Atsushi Imamura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 66 days.

(21) Appl. No.: 18/820,446

(22) Filed: Aug. 30, 2024

(65) Prior Publication Data

US 2025/0074088 A1 Mar. 6, 2025

(30) Foreign Application Priority Data

Aug. 30, 2023 (JP) ................................ 2023-139717

(51) Int. Cl.
*B41J 25/00* (2006.01)
*B41J 25/304* (2006.01)

(52) U.S. Cl.
CPC ............ *B41J 25/001* (2013.01); *B41J 25/304* (2013.01)

(58) Field of Classification Search
CPC ..... G03G 15/6502; B41J 19/00; B41J 19/142; B41J 25/001; B41J 25/304; B41J 25/308; B41J 25/3082; B41J 25/006; B41J 25/316; B41J 25/3088; B65G 1/0414; B26D 1/60
See application file for complete search history.

(56) References Cited

U.S. PATENT DOCUMENTS 5,388,919 A * 2/1995 Kimura .................. B41J 25/316 400/354
6,629,787 B2 * 10/2003 Lee ...................... B41J 25/3082 400/59
6,736,557 B2 * 5/2004 DeVore ................ B41J 25/3088 400/59
7,434,901 B2 * 10/2008 Koh ....................... B41J 2/1752 347/101
8,964,238 B2 2/2015 Miura
2003/0039499 A1 * 2/2003 Kelley ................... B41J 25/308 400/59
2005/0002714 A1 * 1/2005 Tsuji ...................... B41J 23/025 400/59
2014/0049589 A1 * 2/2014 Moriya .................. B41J 25/304 347/104

(Continued)

FOREIGN PATENT DOCUMENTS

JP 2012-152957 A 8/2012

*Primary Examiner* — John P Zimmermann
(74) *Attorney, Agent, or Firm* — Dority & Manning, P.A.

(57) ABSTRACT

A carriage is configured to displace to a approach position Q1 and a retreat position Q2, a control section forms a print region PA in a print portion PP by causing a head to eject liquid while moving the carriage in one direction, the control section starts transport of a medium by a transport section after the print region has been formed in the print portion and before the carriage that is moving in the one direction stops, the control section starts movement of the carriage in an opposite direction before the transport of the medium by the transport section is completed, and the control section causes the carriage to displace from the approach position to the retreat position after the print region has been formed in the print portion and before the head overlaps the print region on a support section.

8 Claims, 17 Drawing Sheets

(56) References Cited

U.S. PATENT DOCUMENTS

| | | | | |
|---|---|---|---|---|
| 2022/0212479 | A1* | 7/2022 | Saito | B41J 2/155 |
| 2023/0133937 | A1* | 5/2023 | Bolumar Barrera | B41J 25/006<br>347/37 |

* cited by examiner

PRINTING DEVICE AND PRINTING METHOD

The present application is based on, and claims priority from JP Application Serial Number 2023-139717, filed Aug. 30, 2023, the disclosure of which is hereby incorporated by reference herein in its entirety.

BACKGROUND

1. Technical Field

The present disclosure relates to a printing device and a printing method.

2. Related Art

JP-A-2012-152957 discloses a printing device including a head that ejects liquid onto a medium, a carriage on which the head is mounted, and a transport section that intermittently transports the medium. The printing device alternately repeats transport of the medium by the transport section and scanning of the carriage. The printing device prints, while the medium is stopped, on the medium by ejecting liquid from the head while scanning the carriage.

In such a printing device, a time period during which the medium is transported and a time period during which the carriage performs scanning are sometimes overlapped in order to improve productivity. At this time, the head may pass above a print region that is formed on the medium. Since both the medium and the head move, the head is more likely to come into contact with the print region. If the head comes into contact with the print region, there is concern that print quality may deteriorate.

SUMMARY

A printing device that solves the above problem includes a transport section that intermittently transports a medium; a support section having a support surface that supports the medium;

a head that prints by ejecting liquid onto a medium supported by the support section while transport of the medium by the transport section is stopped;

a carriage on which the head is mounted; and a control section, wherein the carriage scans with respect to the medium by moving in one direction and in an opposite direction, which is opposite to the one direction and is configured to displace to an approach position and a retreat position by moving in a direction perpendicular to the support surface, the approach position is a position at which the head ejects liquid onto the medium, the retreat position is a position where a distance between the head and the support surface is larger than that of when the head is located at the approach position, the head forms a print region on the medium by ejecting liquid onto a print portion of the medium that is located on the support surface, and the control section forms the print region in the print portion by causing the head to eject liquid while moving the carriage in the one direction, starts, after the print region was formed in the print portion and before the carriage that is moving in the one direction stops, transport of the medium by the transport section, starts, before the transport section completes the transport of the medium, movement of the carriage in the opposite direction, and causes the carriage to, after the print region was formed in the print portion and before the head overlaps the print region on the support section, displace from the approach position to the retreat position.

A printing method that solves above problem includes forming a print region in a print portion of a medium that is located on a support surface of a support section by causing a head to eject liquid while moving a carriage in one direction;

starting transport of the medium after the print region was formed in the print portion and before the carriage that is moving in the one direction stops;

starting, before completion of the transport of the medium, movement of the carriage in an opposite direction, which is opposite to the one direction; and causing the carriage to displace, after the print region was formed in the print portion and before the head overlaps the print region on the support section, from an approach position to a retreat position by moving the carriage in a direction perpendicular to the support surface, wherein compared to when the carriage is located at the approach position, a distance between the head and the support surface is greater in the retreat position.

DESCRIPTION OF EMBODIMENTS

An embodiment of a printing device will be described below with reference to the drawings. The printing device is, for example, an inkjet printer that prints images such as characters and photographs by ejecting ink, which is an example of a liquid, onto a medium such as a paper sheet or fabric. The printing device is, for example, a label printer.

Printing Device

Figure 1:
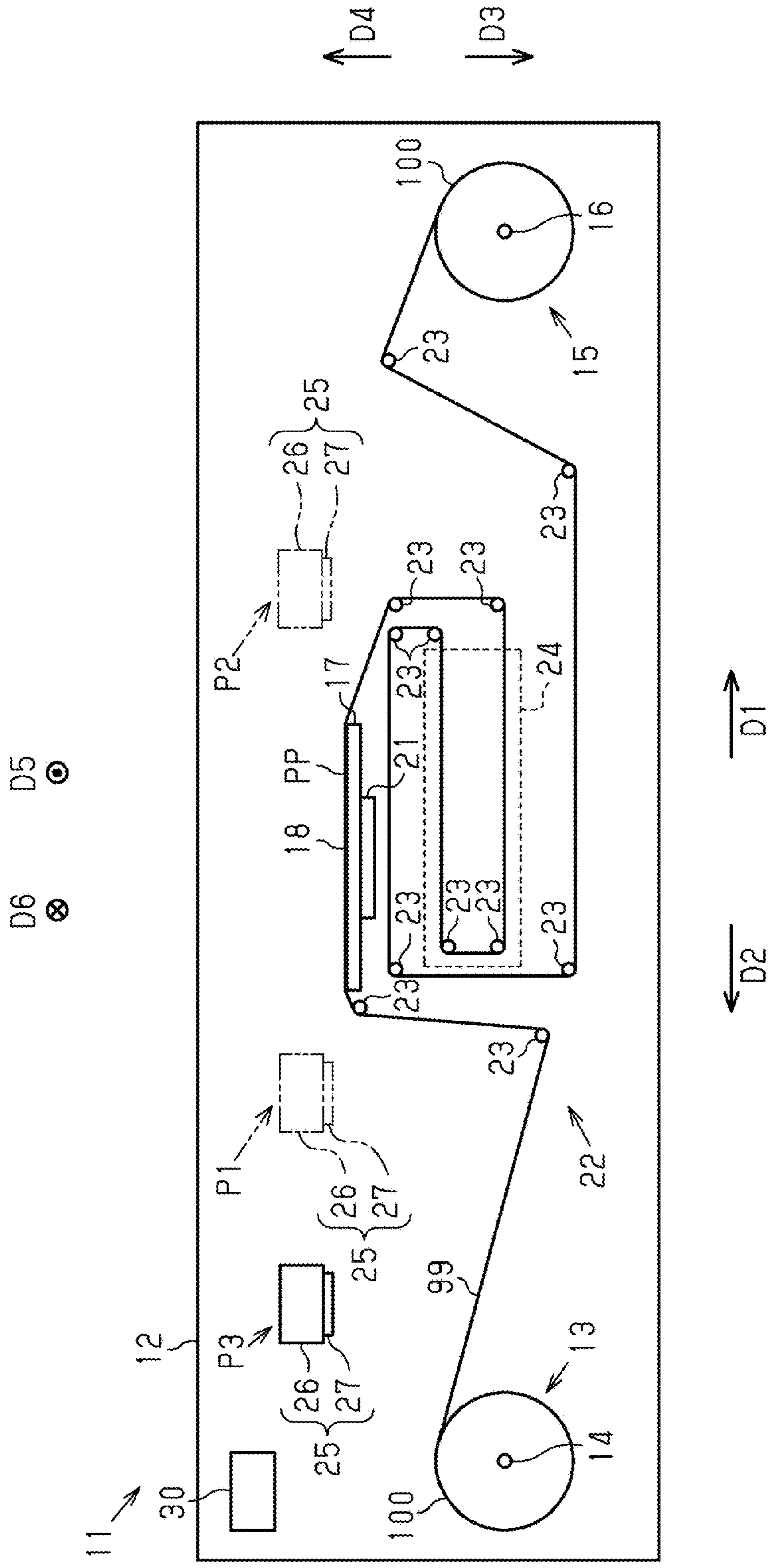
FIG. 1 is a side view showing one embodiment of a printing device.

As shown in FIG. 1, the printing device 11 is equipped with a housing 12. The printing device 11 is equipped with a feed section 13. The feed section 13 is configured to feed a medium 99. The feed section 13 is housed inside the housing 12, for example. The feed section 13 has a feed shaft 14. The feed shaft 14 rotatably holds a roll body 100 on which the medium 99 is wound. The feed shaft 14 holds the medium 99 before printing. As the feed shaft 14 rotates, the medium 99 is fed from the feed section 13. The feed shaft 14 may be driven and rotated by a motor, or may be driven and rotated as the medium 99 is pulled.

The printing device 11 is equipped with a winding section 15. The winding section 15 is configured to wind the medium 99. The winding section 15 is housed inside the housing 12, for example. The winding section 15 has a winding shaft 16. The winding shaft 16 rotatably holds the roll body 100 in the same manner as the feed shaft 14. The winding shaft 16 holds the medium 99 after printing. As the winding shaft 16 rotates, the winding section 15 winds the medium 99. The winding shaft 16 is driven and rotated by, for example, a motor.

The printing device 11 is equipped with a support section 17. The support section 17 supports the medium 99. The support section 17 is housed inside the housing 12, for example. The support section 17 supports, for example, the medium 99 from below. The support section 17 supports the medium 99 in a process from the time the medium 99 is fed from the feed section 13 to the time the medium 99 is wound by the winding section 15.

Figure 2:
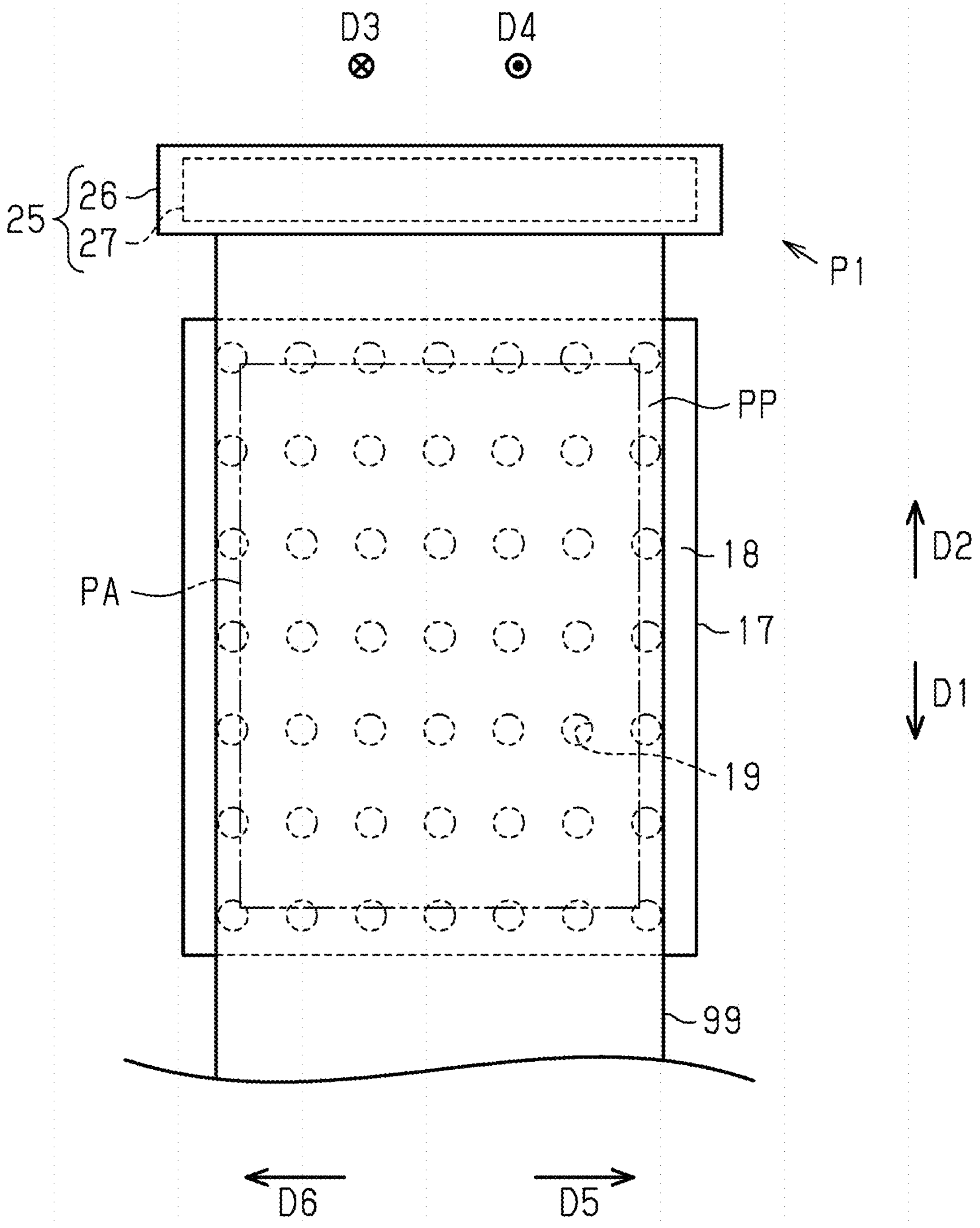
FIG. 2 is a plan view of a support section as viewed from above.

As shown in FIG. 2, the support section 17 has a support surface 18. The support surface 18 is a surface that contacts the medium 99 in the support section 17. The support section 17 supports the medium 99 by the support surface 18. The support surface 18 faces upward, for example, in the support section 17. When the support section 17 is viewed from a position facing the support surface 18, that is, when the support section 17 is viewed from above the support section 17, the support surface 18 overlaps the medium 99.

A portion of the medium 99 that is supported by the support section 17 is a print portion PP. In other words, the print portion PP is a portion of the medium 99 that is located on the support surface 18. Specifically, the print portion PP is a part of the medium 99 that overlaps the support surface 18 when viewed from a position facing the support surface 18.

In the printing device 11, printing is performed with respect to the print portion PP of the medium 99. A print region PA is formed in the print portion PP. The print region PA is a region that was printed on. In other words, the print region PA is a region in which an image is formed. In FIG. 2, the print region PA is indicated by a two-dot chain line. The print region PA may be formed over the entire print portion PP or may be formed over a part of the print portion PP.

The support section 17 may have one or more through holes 19. The through holes 19 are open to the support surface 18. For example, the through holes 19 are blocked by the medium 99 that is located on the support surface 18. The plurality of through holes 19 may be disposed regularly or irregularly on the support surface 18.

As shown in FIG. 1, the printing device 11 is equipped with a suction section 21. The suction section 21 is configured to suck the medium 99 onto the support section 17. The suction section 21 sucks the medium 99 onto the support section 17, for example, by sucking the medium 99 through the support section 17. The suction section 21 includes, for example, a suction pump. The suction section 21 sucks the medium 99 through the through holes 19. By this, the medium 99 is sucked onto the support surface 18. The suction section 21 may attract the medium 99 onto the support section 17 by generating static electricity, for example.

The suction section 21, for example, can change suction force by controlling force of suction. The suction section 21 changes the suction force in accordance with transport of the medium 99, for example. For example, when the medium 99 is transported, the suction section 21 reduces the suction force as compared with the case where the transport of the medium 99 is stopped. When the medium 99 is transported, the suction section 21 relatively decreases the suction force. When the medium 99 is transported, by causing the suction force of the suction section 21 to become relatively small, the medium 99 is easier to move on the support section 17. When printing is performed on the medium 99, that is, when the transport of the medium 99 is stopped, the suction section 21 relatively increases the suction force. When the transport of the medium 99 is stopped, by causing the suction force of the suction section 21 to become relatively greater, a position of the medium 99 on the support section 17 is less likely to shift.

The printing device 11 is equipped with a transport section 22. The transport section 22 is configured to transport the medium 99. For example, the transport section 22 is housed inside the housing 12. The transport section 22 transports the medium 99 from the feed section 13 toward the winding section 15.

The transport section 22 transports the medium 99 from the feed section 13 toward the support section 17. In one example, the transport section 22 transports the medium 99 from below the support section 17 toward the support section 17. The transport section 22 transports the medium 99 so that the medium 99 passes on the support section 17. The transport section 22 transports the medium 99 along the support surface 18. The transport section 22 transports the medium 99 from the support section 17 toward the winding section 15. In one example, the transport section 22 transports the medium 99 from the support section 17 toward a position lower than the support section 17. In other words, a portion of the medium 99 that has been printed on is transported from the support section 17 toward a position lower than the support section 17.

The transport section 22 intermittently transports the medium 99. In other words, the transport section 22 repeats start of transport and stop of transport. When printing on the medium 99 is being performed, the transport section 22 stops transport of the medium 99. When printing on the medium 99 is not being performed, for example, when printing on the medium 99 is completed, the transport section 22 starts transport of the medium 99. In the printing device 11, printing on the medium 99 and transport of the medium 99 are alternately repeated. Note that "when printing on the medium 99 is completed" means a case when a print section 25 (to be described later) has completed printing on the print portion PP during a time period that the medium 99 is stopped in intermittent transport.

The transport section 22 has one or more transport rollers 23. The transport rollers 23 are located, for example, inside the housing 12. The transport roller 23 transports the medium 99 by rotating. The medium 99 is wound around the transport rollers 23. The transport rollers 23 may nip the medium 99. The medium 99 is transported by the rotation of the transport rollers 23. The transport rollers 23 include, for example, a roller that is driven to rotate by a motor. The transport rollers 23 are located, for example, below the support surface 18.

The printing device 11 is equipped with a drying section 24. The drying section 24 is configured to dry a medium 99 that has been printed on. The drying section 24 dries the medium 99 in a process in which the medium 99 is transported from the support section 17 to the winding section 15. The drying section 24 is located, for example, inside the housing 12. In one example, the drying section 24 is located directly below the support section 17. The drying section 24 may include a heater that heats the medium 99. The drying section 24 may include a fan that blows air onto the medium 99. The drying section 24 dries the medium 99 by heating the medium 99 or blowing air to the medium 99.

The printing device 11 is equipped with the print section 25. The print section 25 is configured to print on the medium 99. The print section 25 performs printing on the medium 99 by ejecting liquid onto the medium 99. The print section 25 prints in the print portion PP. The print section 25 is housed inside the housing 12, for example.

The print section 25 has a carriage 26 and a head 27. The carriage 26 and the head 27 pass above the support section 17. The carriage 26 and the head 27 face the support section 17. For example, the carriage 26 and the head 27 are located above the support section 17.

The carriage 26 mounts the head 27. The carriage 26 holds the head 27 so that the head 27 faces the support section 17. The carriage 26 is configured to move with respect to the medium 99. As the carriage 26 moves, the head 27 also moves with it.

The carriage 26 is configured to move in one direction and in an opposite direction of it. Specifically, the carriage 26 is configured to move in a first direction D1 and a second direction D2. The carriage 26 scans the medium 99 by moving in the first direction D1 and the second direction D2. The first direction D1 and the second direction D2 are directions along the support surface 18. For example, the first direction D1 coincides with a direction in which the medium 99 is moved on the support surface 18 by the transport section 22. The second direction D2 is a direction that is opposite to the first direction D1.

The carriage 26 scans the print portion PP by moving in the first direction D1 and the second direction D2. In other words, the carriage 26 scans above the support section 17. When viewed from a position facing the support surface 18, the carriage 26 scans so as to pass the print portion PP.

The carriage 26 displaces to several positions by scanning. The carriage 26 displaces to, for example, a first position P1, a second position P2, and a home position P3 by moving in the first direction D1 and the second direction D2.

The first position P1 and the second position P2 are positions through which the carriage 26 passes during printing. The first position P1 is a position that is shifted in the second direction D2 from the support section 17. The carriage 26 passes above the support section 17 by moving in the first direction D1 from the first position P1. The second position P2 is a position that is shifted in the first direction D1 from the support section 17. The carriage 26 passes above the support section 17 by moving in the second direction D2 from the second position P2. The carriage 26 reciprocates between the first position P1 and the second position P2 during printing. The carriage 26 passes above the support section 17 in a process of displacing from the first position P1 to the second position P2 and in a process of displacing from the second position P2 to the first position P1.

One of the first position P1 and the second position P2 is a start position, which is a start position of printing. The other of the first position P1 and the second position P2 is a return position, which is a turnaround position of printing. The carriage 26 waits in the start position before printing starts. When printing starts, the carriage 26 moves from the start position to the return position. When the carriage 26 reaches the return position, it turns back from the return position to the start position. In other words, in a movement path of the carriage 26, a path from the start position to the return position is a forward path. In the movement path of the carriage 26, a path from the return position to the start position is a return path.

The home position P3 is a position where the carriage 26 waits. The carriage 26 normally waits at the home position P3. The carriage 26 is located at the home position P3, for example, when the print section 25 does not print on the medium 99. In one example, the home position P3 is a position that is shifted in the second direction D2 from the support section 17. Specifically, the home position P3 is a position that is shifted from the first position P1 in the second direction D2. The home position P3 may be a position that is shifted in the first direction D1 from the second position P2. The carriage 26 moves from the home position P3 to the start position before printing starts.

The carriage 26 is configured to move in a direction perpendicular to the support surface 18. Specifically, the carriage 26 is configured to move in a third direction D3 and a fourth direction D4. The carriage 26 changes a gap between the head 27 and the support section 17 by moving in the third direction D3 and the fourth direction D4. In one example, the third direction D3 is the vertical direction. The fourth direction D4 is a direction opposite to the third direction D3. The third direction D3 and the fourth direction D4 are directions different from the first direction D1 and the second direction D2.

Figure 3:
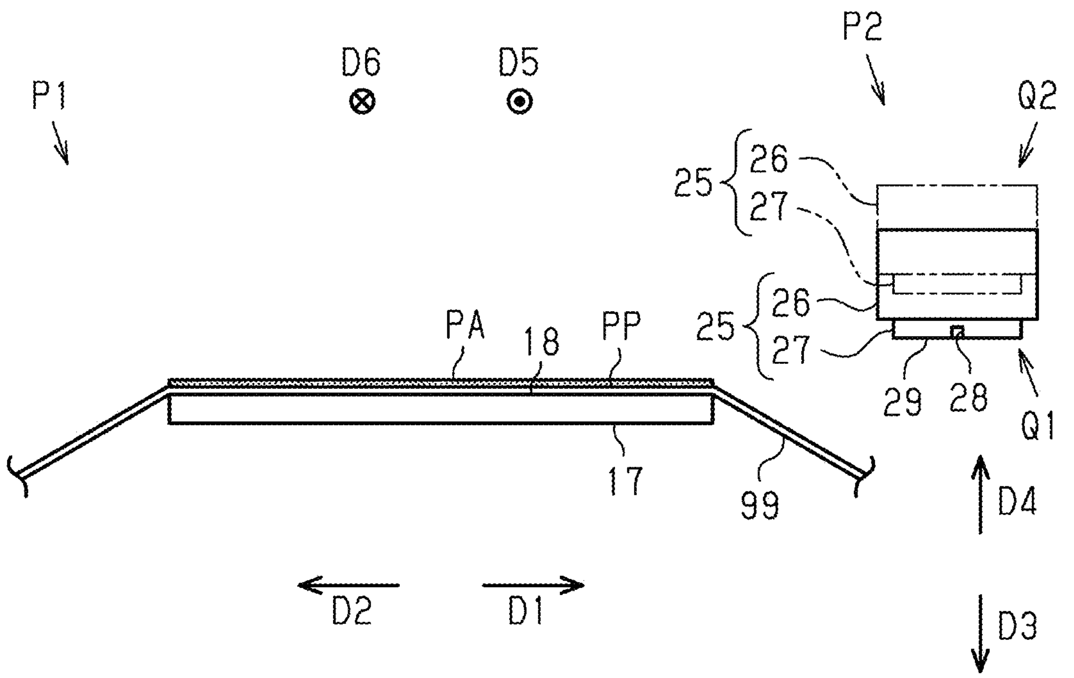
FIG. 3 is a side view showing an approach position and a retreat position of a carriage.

As shown in FIG. 3, the carriage 26 displaces between an approach position Q1 and a retreat position Q2 by moving in the third direction D3 and the fourth direction D4. The approach position Q1 is a position where the head 27 approaches the support section 17. The approach position Q1 is a position where the head 27 ejects liquid onto the medium 99. The approach position Q1 is a position of the carriage 26 shown by a solid line in FIG. 3. The retreat position Q2 is a position where the head 27 is separated from the support section 17. The retreat position Q2 is a position of the carriage 26 shown by a two-dot chain line in FIG. 3. A distance between the head 27 located at the retreat position Q2 and the support section 17 is larger than a distance between the head 27 located at the approach position Q1 and the support section 17. In other words, the retreat position Q2 is a position where a distance between the head 27 and the support surface 18 is larger than that of when the head 27 is located at the approach position Q1. The carriage 26 changes the gap between the head 27 and the support section 17 by moving in the third direction D3 and the fourth direction D4.

The carriage 26 can displace to the approach position Q1 and the retreat position Q2 regardless of its position in the first direction D1. The carriage 26 can displace to the approach position Q1 and the retreat position Q2 while being located at the first position P1. The carriage 26 can displace to the approach position Q1 and the retreat position Q2 while being located at the second position P2. The carriage 26 can displace to the approach position Q1 and the retreat position Q2 while being located at the home position P3. The carriage 26 can displace to the approach position Q1 and the retreat position Q2 while moving in the first direction D1. The carriage 26 can displace to the approach position Q1 and the retreat position Q2 while moving in the second direction D2.

The carriage 26 may be configured to move in a fifth direction D5 and a sixth direction D6. For example, the carriage 26 may perform linefeed with respect to the medium 99 by moving in the fifth direction D5 and the sixth direction D6. The carriage 26 may repeat scanning and linefeed with respect to the medium 99. The fifth direction D5 and the sixth direction D6 are directions along the support surface 18. The fifth direction D5 and the sixth direction D6 are directions different from the first direction D1 and the second direction D2. In one example, the fifth direction D5 and the sixth direction D6 are directions that serve as indices indicating a width of the medium 99.

Since the direction in which medium 99 moves on the support surface 18 coincides with the first direction D1, the printing device 11 is a lateral printer. The direction in which medium 99 moves on the support surface 18 may coincide with the second direction D2. The printing device 11 may be a serial printer. In this case, the first direction D1 and the second direction D2 do not coincide with the direction in which the medium 99 moves on the support surface 18. The first direction D1 and the second direction D2 are directions that serve as indices indicating the width of medium 99.

The head 27 has a nozzle surface 29 through which one or more nozzles 28 are open. The nozzle surface 29 is a surface of the head 27 that faces the support surface 18. In one example, the nozzle surface 29 faces the third direction D3. The head 27 ejects liquid from the nozzles 28. The head 27 ejects liquid onto the medium 99 that is supported by the support section 17. Specifically, the head 27 ejects liquid to the print portion PP. The head 27 forms the print region PA in the print portion PP. The head 27 ejects liquid onto the medium 99 while the transport section 22 stops transport of the medium 99.

The head 27 moves with respect to the support section 17 together with the carriage 26. The head 27 ejects liquid onto the medium 99 while scanning together with the carriage 26. Specifically, the head 27 ejects liquid onto the medium 99 while moving in one direction together with the carriage 26. The head 27 may eject liquid onto the medium 99 while moving in the first direction D1 together with the carriage 26, or may eject liquid onto the medium 99 while moving in the second direction D2 together with the carriage 26. In other words, the head 27 may eject liquid onto the medium 99 in the forward path or may eject liquid onto the medium 99 in the return path. The head 27 may eject liquid onto the medium 99 in both the forward path and the return path.

A width of the head 27 may be the same as the width of the medium 99, or may be larger than the width of the medium 99. In one example, the head 27 is a line head that is capable of ejecting liquid simultaneously over an entire width of the medium 99. By this, the head 27 can eject liquid onto an entire region of the print portion PP only by moving once, together with the carriage 26, in the first direction D1 or the second direction D2. In other words, the head 27 can perform printing on the entire region of the print portion PP without linefeed of the carriage 26 in the fifth direction D5 and the sixth direction D6.

The width of the head 27 may be smaller than the width of the medium 99. In this case, the head 27 can eject liquid over the entire width of the medium 99 by scanning and linefeed. Specifically, the head 27 prints over the entire width of the medium 99 by repeating scanning and linefeed alternately.

The print section 25 prints in a predetermined number of passes with respect to the print portion PP. "A number of passes" indicates the number of times that the head 27 moves above the support section 17 in order to complete printing in the print portion PP, that is, in order to form the print region PA in the print portion PP. The number of passes is a number of times the carriage 26 moves above the print portion PP while the head 27 ejects liquid. For example, the print section 25 performs printing in the print portion PP in one pass. In this case, by the carriage 26 passing once above the print portion PP, the printing by the head 27 is completed. In other words, the printing by the head 27 is completed by the carriage 26 moving in the forward path or the return path. The print section 25 may perform multi-pass printing with respect to the print portion PP. In this case, the printing by the head 27 is completed by the carriage 26 passing above the print portion PP multiple times.

The print section 25 may perform unidirectional printing on the medium 99. Unidirectional printing is a printing method in which a movement direction of the carriage 26 that moves while ejecting liquid from the print head 27 is a single direction. In unidirectional printing, the print section 25 ejects liquid onto the medium 99 while moving in the first direction D1, or ejects liquid onto the medium 99 while moving in the second direction D2. In other words, unidirectional printing is a printing method in which, when the carriage 26 reciprocates with respect to the medium 99, the head 27 ejects liquid in either the forward path or the return path.

The print section 25 may perform bidirectional printing on the medium 99. Bidirectional printing is a printing method in which a movement direction of the carriage 26 that moves while ejecting liquid by the head 27 is multiple directions. In bidirectional printing, the print section 25 ejects liquid onto medium 99 while moving in the first direction D1, and ejects liquid onto medium 99 while moving in the second direction D2. In other words, bidirectional printing is a printing method in which, when the carriage 26 reciprocates with respect to the medium 99, the head 27 ejects liquid in both of the forward path and the return path.

As shown in FIG. 1, the printing device 11 is equipped with a control section 30. The control section 30 provides overall control of the printing device 11. The control section 30 controls, for example, the suction section 21, the transport section 22, the print section 25, and the like. The control section 30 controls transport of the medium 99 and printing on the medium 99. The control section 30 alternately performs transport of the medium 99 and printing on the medium 99.

The control section 30 may be constituted by one or more processors that execute various processes in accordance with computer programs. The control section 30 may be configured by one or more dedicated hardware circuits such as an application specific integrated circuit that executes at least a part of various processes. The control section 30 may be constituted by a circuit including a combination of a processor and a hardware circuit. The processor includes a CPU and memory, such as RAM and ROM. The memory stores program codes or instructions configured to cause the CPU to perform processes. The memory, or a computer-readable medium, includes any readable medium that can be accessed by a general-purpose or dedicated computer.

Printing Operation

Next, a printing operation will be described. The printing operation is performed by the control section 30. The printing operation is an operation of printing on the medium 99. The printing operation is performed, for example, when print instructions are input from the user. In the printing operation, the control section 30 controls a transport timing of the medium 99 by the transport section 22 and a movement timing of the carriage 26.

The control section 30 controls start and stop of the transport by controlling the transport section 22 during the printing operation. The control section 30 controls the transport timing of the medium 99 in accordance with the printing by the print section 25. Specifically, the control section 30 controls the transport timing of the medium 99 so that a time period during which the carriage 26 scans overlaps with a time period during which the medium 99 is transported. By this, for example, productivity of the printing device 11 is improved compared to a case where the transport of the medium 99 is started after the scanning of the carriage 26 has been completed.

In the printing operation, the control section 30 controls a start of the movement and a stop of the movement of the carriage 26 by controlling the print section 25. Specifically, the control section 30 controls the movement timing in the first direction D1 and the second direction D2. The control section 30 controls a movement timing of the carriage 26 in accordance with transport of the medium 99 by the transport section 22. Specifically, the control section 30 controls a movement timing of the carriage 26 so that a time period during which the carriage 26 scans overlaps with a time period during which the medium 99 is transported. By this, for example, productivity of the printing device 11 is improved compared to a case where scanning of the carriage 26 starts after the transport of the medium 99 has been completed.

Figure 4:
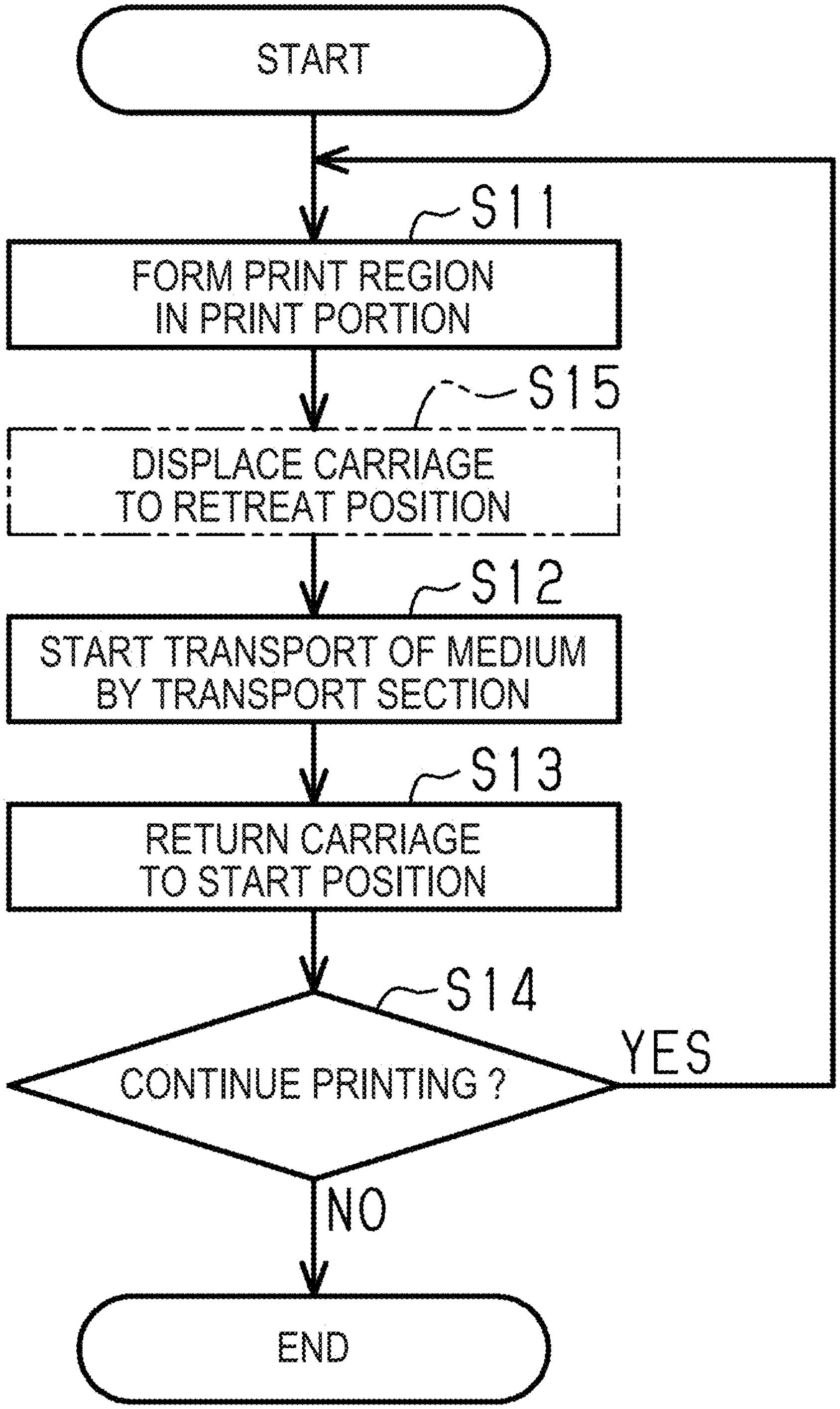
FIG. 4 is a flowchart showing one example of printing operation.

As shown in FIG. 4, in step S11, the control section 30 forms the print region PA in the print portion PP. Specifically, the control section 30 forming the print region PA in the print portion PP by causing the head 27 to eject liquid while moving the carriage 26 in one direction. The control section 30, by causing the head 27 to eject liquid while moving the carriage 26 in the first direction D1, or causing the head 27 to eject liquid while moving the carriage 26 in the second direction D2, forms the print region PA in the print portion PP.

In step S12, the control section 30 starts transport of the medium 99 by the transport section 22. At this time, the control section 30 starts the transport of the medium 99 by the transport section 22 after the print region PA has been formed in the print portion PP and before the carriage 26 that is moving in one direction stops. In other words, the control section 30 starts the transportation of the medium 99 after the printing in the print portion PP has been completed and before the carriage 26 that performs scanning stops. By this, a time period in which the carriage 26 performs scanning and a time period in which the medium 99 is transported overlap each other. As a result, the transport of the medium 99 is started quickly.

In step S13, the control section 30 returns the carriage 26 to the start position. At this time, the control section 30 starts movement of the carriage 26 in the opposite direction before the transport of the medium 99 by the transport section 22 is completed. In other words, the control section 30 starts the return of the carriage 26 before the transport of the medium 99 by the transport section 22 is completed. By this, a time period in which the carriage 26 performs scanning and a time period in which the medium 99 is transported overlap each other. As a result, the carriage 26 can be quickly returned to the original position.

In step S13, the control section 30 may move the carriage 26 in the opposite direction at a speed higher than the transport speed of the medium 99. In step S13, since liquid is not ejected by the head 27, the carriage 26 can return to the start position at a high speed.

In step S14, the control section 30 determines whether or not to continue printing. In other words, the control section 30 determines whether or not to form a print region PA also in a next print portion PP. If printing is to be continued, the control section 30 returns the process to step S11. By repeating a set of steps from step S11 to step S13, the control section 30 sequentially forms the print regions PA in the print portions PP. When the control section 30 does not continue printing, the control section 30 ends the printing operation.

Figure 5:
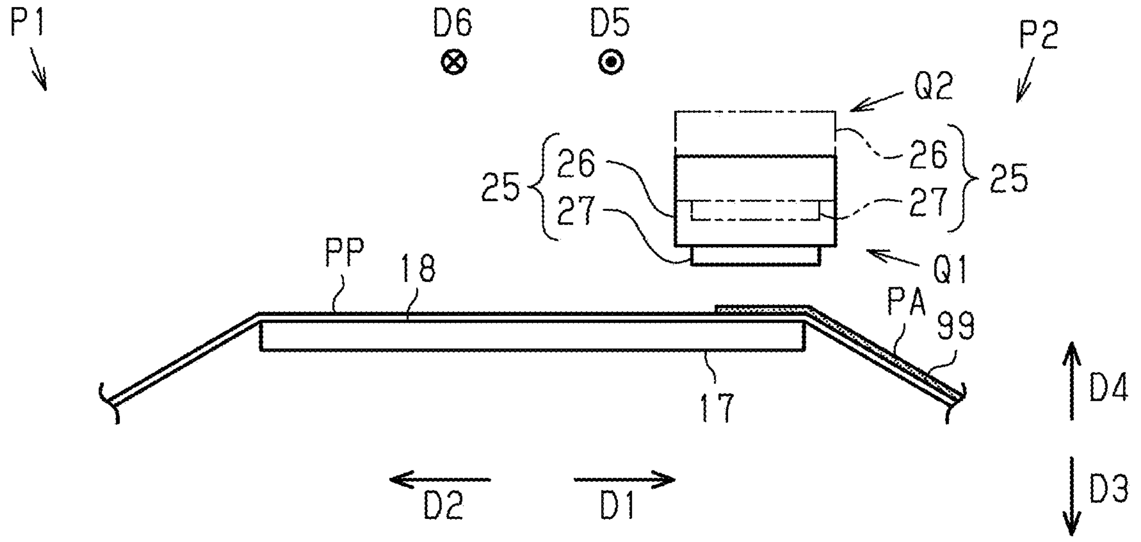
FIG. 5 is a side view when a head overlaps a print region on the support section.

As shown in FIG. 5, in a case where the time period in which the carriage 26 performs scanning and the time period in which the medium 99 is transported overlap each other, productivity is improved. However, the carriage 26 may pass above the print region PA on the support section 17. For example, if movement of the carriage 26, which is located at the second position P2, in the second direction D2 is started before the transport of the medium 99 by the transport section 22 is completed, the head 27 may overlap the print region PA above the support section 17. In this case, there is concern that the head 27 may come into contact with the print region PA. In particular, when the medium 99 is transported, since the suction force of the suction section 21 becomes smaller, the medium 99 is tends to lift off from the support section 17. Therefore, when the head 27 overlaps with the print region PA above the support section 17, the head 27 is likely to come into contact with the print region PA. If the head 27 comes into contact with the print region PA, there is concern that the print quality may deteriorate.

When the carriage 26 passes above the support section 17 in a state of being located at the approach position Q1, there is a great concern that the head 27 comes into contact with the print region PA. On the other hand, when the carriage 26 passes above the support section 17 in a state of being located at the retreat position Q2, there is little concern that the head 27 comes into contact with the print region PA. Therefore, in the printing operation, the control section 30 causes the carriage 26 to displace from the approach position Q1 to the retreat position Q2 after the print region PA has been formed in the print portion PP and before the head 27 overlaps the print region PA on the support section 17.

As shown in FIG. 4, in the printing operation, the control section 30 executes step S15 after step S11 has been completed. In step S15, the control section 30 causes the carriage 26 to displace from the approach position Q1 to the retreat position Q2. Specifically, the control section 30 causes the carriage 26 to displace from the approach position Q1 to the retreat position Q2 after the print region PA has been formed in the print portion PP and before the head 27 overlaps the print region PA on the support section 17. The control section 30 starts movement of the carriage 26 in the fourth direction D4 before the head 27 overlaps the print region PA on the support section 17.

The control section 30 may displace the carriage 26 from the approach position Q1 to the retreat position Q2 after the print region PA has been formed in the print portion PP and before the carriage 26 that is moving in one direction stops. The control section 30 may displace the carriage 26 from the approach position Q1 to the retreat position Q2 while the carriage 26 is stopped in the return position. The control section 30 may displace the carriage 26 from the approach position Q1 to the retreat position Q2 before the head 27 overlaps the print region PA in the support section 17 after the movement of the carriage 26 in the opposite direction has been started. By this, concern that the head 27 overlaps, in the state where the carriage 26 is located at the approach position Q1, with the print region PA on the support section 17 is reduced. Therefore, concern that the head 27 comes into contact with the print region PA is reduced.

In step S13, the control section 30 returns the carriage 26, which is located at the retreat position Q2, to the start position. At this time, a movement speed of the carriage 26 is faster than a transport speed of the medium 99 by the transport section 22. By this, it is possible to quickly return the carriage 26 to the start position while suppressing the concern that the head 27 comes into contact with the print region PA. The control section 30 causes the carriage 26 to displace from the retreat position Q2 to the approach position Q1 before printing starts again.

Next, a printing operation in unidirectional printing will be described. The control section 30 performs unidirectional printing on the medium 99 by controlling the transport section 22, the carriage 26, and the head 27. First, a case where the print section 25 performs printing in the forward path will be described.

Figure 6:
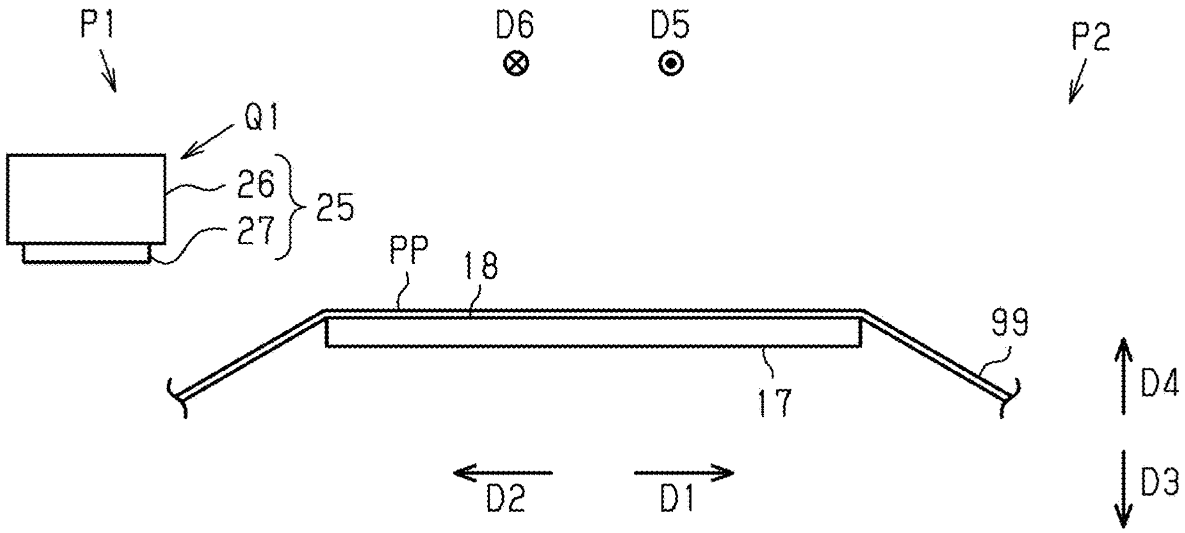
FIG. 6 is a side view when the carriage stands by at a first position in unidirectional printing, which prints in a forward path.

As shown in FIG. 6, the control section 30 causes the carriage 26 to wait at a start position, for example, the first position P1 before printing starts. At this time, the carriage 26 is located at the approach position Q1. The control section 30 then moves the carriage 26 from the start position to the return position. In other words, the control section 30 moves the carriage 26 in the first direction D1 from the first position P1 toward the second position P2. By this, the carriage 26 and the head 27 move in the forward path. At this time, the control section 30 starts the movement of the carriage 26 while the medium 99 is stopped.

Figure 7:
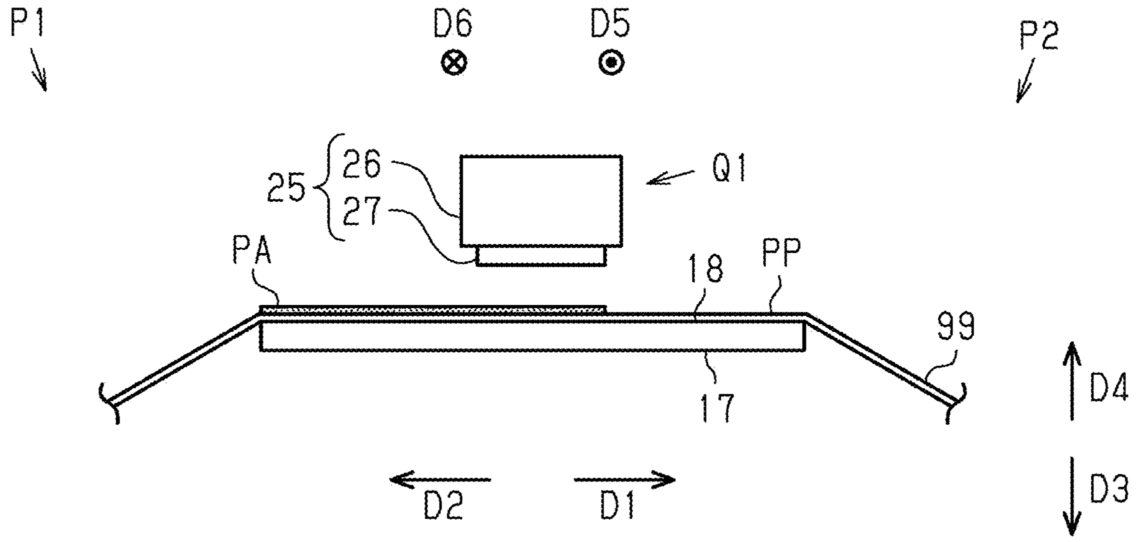
FIG. 7 is a side view during printing in unidirectional printing, which prints in the forward path.

As shown in FIG. 7, the control section 30 causes the head 27 to eject liquid while the carriage 26 moves over above the print portion PP. By this, the print region PA is printed in the print portion PP. The control section 30 causes the head 27 to eject liquid while moving the carriage 26 with respect to the print portion PP.

Figure 8:
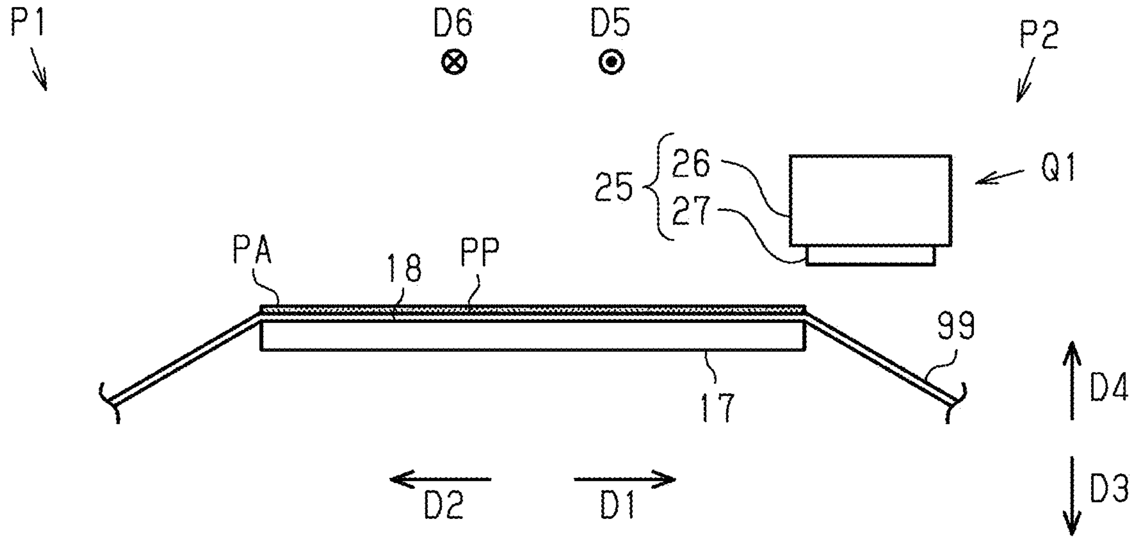
FIG. 8 is a side view after printing in unidirectional printing, which prints in the forward path.
Figure 9:
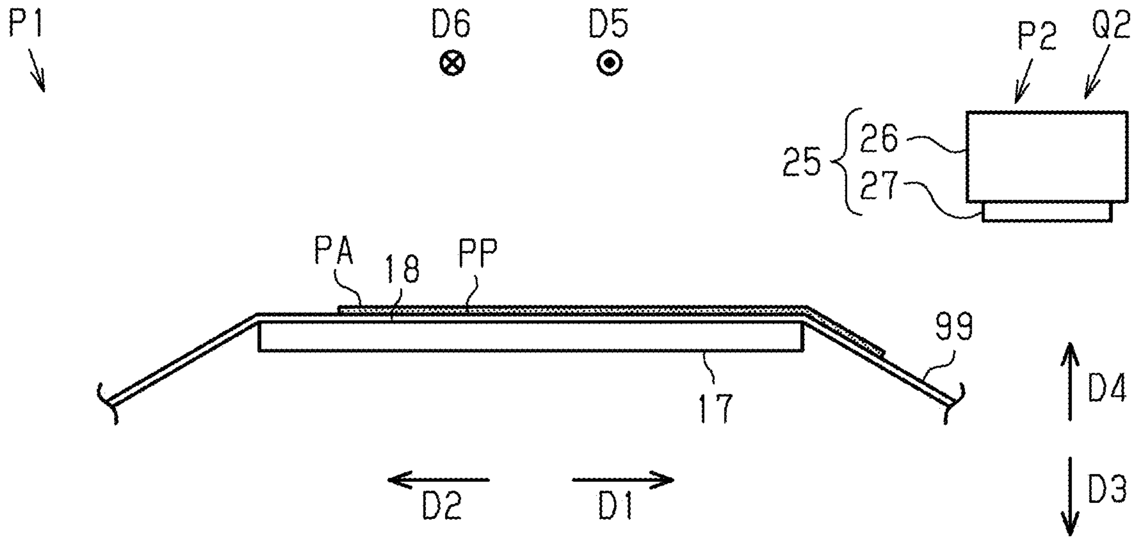
FIG. 9 is a side view when the carriage is located at a second position in unidirectional printing, which prints in the forward path.

As shown in FIGS. 8 and 9, the control section 30 starts transport of the medium 99 by the transport section 22 after the print region PA has been formed in the print portion PP and before the carriage 26 that is moving in the first direction D1 stops. The control section 30 starts the transport of the medium 99 by the transport section 22, for example, after the ejection of liquid by the head 27 has been completed and before the carriage 26 reaches the second position P2. In other words, a time period during which the carriage 26 moves overlaps with a time period during which the medium 99 is transported. By this, productivity of the printing device 11 is improved compared to the case where the transport of the medium 99 starts after the carriage 26 has stopped.

The control section 30 may start the transport of the medium 99 by the transport section 22 after last liquid ejected by the head 27 has landed on the medium 99 and before the carriage 26 stops. The control section 30 detects that the last liquid has landed on the medium 99, for example, by counting the time elapsed since the head 27 ejected the last liquid. The control section 30 may start the transport of the medium 99 by the transport section 22 after a predetermined time has elapsed since the head 27 lastly ejected liquid and before the carriage 26 stops. If the transport of the medium 99 by the transport section 22 is started before the liquid ejected from the head 27 lands on the medium 99, there is concern that the landing position of the liquid may be shifted. However, by starting the transport of the medium 99 after the last liquid ejected by the head 27 has landed on the medium 99, productivity of the printing device 11 is improved while suppressing a deterioration in print quality. The control section 30 may start the transport of the medium 99 by the transport section 22 after the last liquid ejected by the head 27 has landed on the medium 99, after the head 27 has passed through the position where the last liquid landed on the medium 99 and before the carriage 26 stops. By this, it reduces concern that the print region PA and the head 27 may come into contact with each other.

"The last liquid ejected by the head 27" refers to the liquid that was most recently ejected by the head 27 before the transport of the medium 99 starts. In the printing device 11, transport of the medium 99 and printing on the medium 99 are alternately performed. Therefore, the ejection of liquid performed immediately before the start of the transport the medium 99 is the last ejection of liquid in a single print process.

The control section 30 may start the transport of the medium 99 by the transport section 22 after the head 27 has passed the print region PA and before the carriage 26 stops. Specifically, the control section 30 may start the transport of the medium 99 by the transport section 22, as viewed from a position facing the support surface 18, after the head 27 has passed the print region PA and before the carriage 26 stops. By this, for example, in a case where printing is performed in only a part of the print portion PP, it is possible to advance timing at which the transport of the medium 99 starts compared to a case where the transport by the transport section 22 starts after the head 27 has passed the print portion PP. Therefore, productivity of the printing device 11 is improved.

The control section 30 causes the carriage 26 to displace from the approach position Q1 to the retreat position Q2 after the print region PA has been formed in the print portion PP and before the head 27 overlaps the print region PA on the support section 17. In one example, the control section 30 causes the carriage 26 to displace from the approach position Q1 to the retreat position Q2 after the print region PA has been formed in the print portion PP and before the carriage 26 that is moving in the first direction D1 stops.

As shown in FIG. 9, the control section 30 stops the carriage 26 at the return position. Specifically, the control section 30 stops the carriage 26 that has reached the second position P2. At this time, the transport of the medium 99 is continued. Since the medium 99 is transported downward from the support section 17, there is little concern that the medium 99 will come into contact with the head 27 that has passed above the support surface 18.

Figure 10:
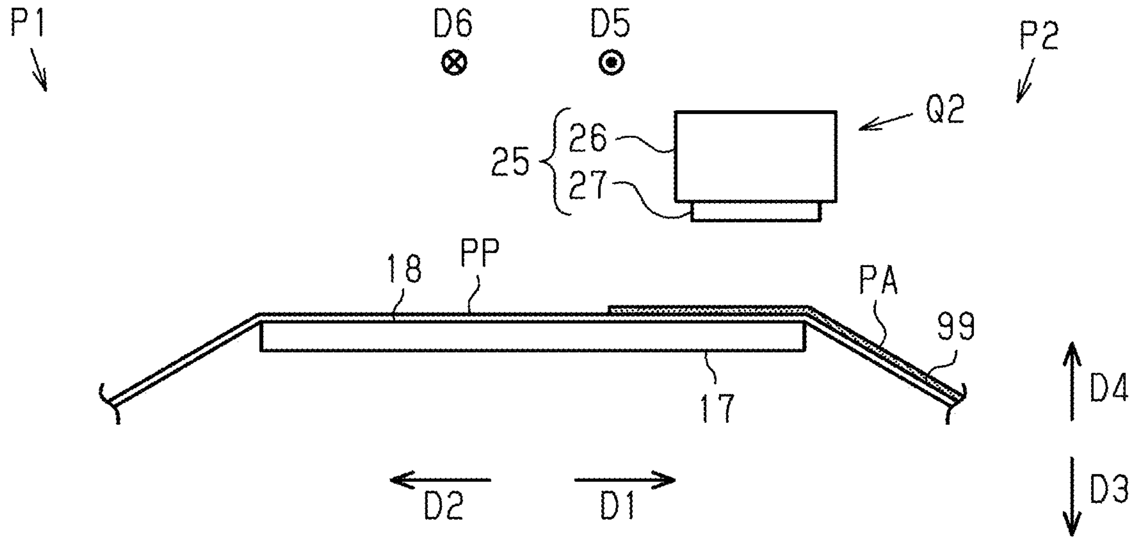
FIG. 10 is a side view when the carriage returns from the second position to the first position in unidirectional printing, which prints in the forward path.

As shown in FIG. 10, the control section 30 starts movement of the carriage 26 in the second direction D2 before the transport of the medium 99 by the transport section 22 stops. In other words, the control section 30 causes the carriage 26 to start returning to the start position before the transport of the medium 99 by the transport section 22 stops. The control section 30 may move the carriage 26 in the second direction D2 at a speed that is higher than the transport speed of the medium 99. The control section 30 moves the medium 99 in the second direction D2 from the second position P2 toward the first position P1 before the transport of the medium 99 by the transport section 22 stops. At this time, the carriage 26 and the head 27 move in the return path. By this, a time period during which the carriage 26 moves overlaps with a time period during which the medium 99 is transported. Therefore, productivity of the printing device 11 is improved compared to a case where the movement of the carriage 26 in the second direction D2 starts after the completion of the transport of the medium 99 by the transport section 22.

While the medium 99 is being transported, the head 27 overlaps the print region PA on the support section 17 by moving the carriage 26 in the second direction D2. At this time, since the carriage 26 is located at the retreat position Q2, concern that the head 27 comes into contact with the print region PA is reduced.

Figure 11:
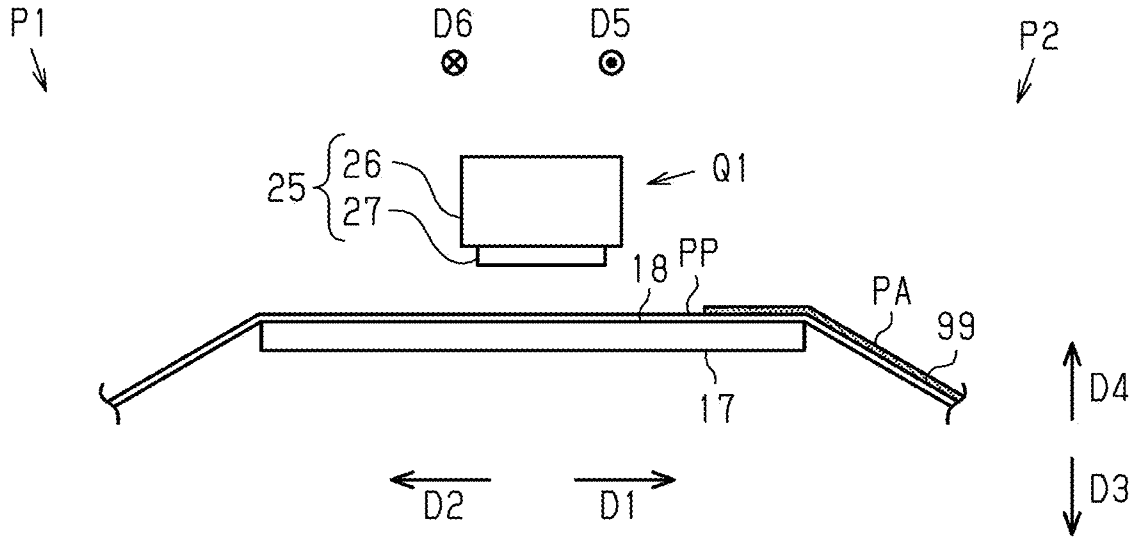
FIG. 11 is a side view when the head has passed above the print region in unidirectional printing, which prints in the forward path.

As shown in FIG. 11, the control section 30 causes the carriage 26 to displace from the retreat position Q2 to the approach position Q1 after the head 27 has passed above the print region PA. For example, the control section 30 causes the carriage 26 to start moving in the third direction D3 after the head 27 has passed above the print region PA. In this example, the head 27 passes the print region PA on the support section 17. Therefore, the carriage 26 can displace to the approach position Q1 in above the support section 17 after the head 27 has passed above the print region PA. In this case, for example, the carriage 26 can quickly displace to the approach position Q1 compared to a case where the carriage 26 displaces to the approach position Q1 after the head 27 has passed above the support surface 18.

Figure 12:
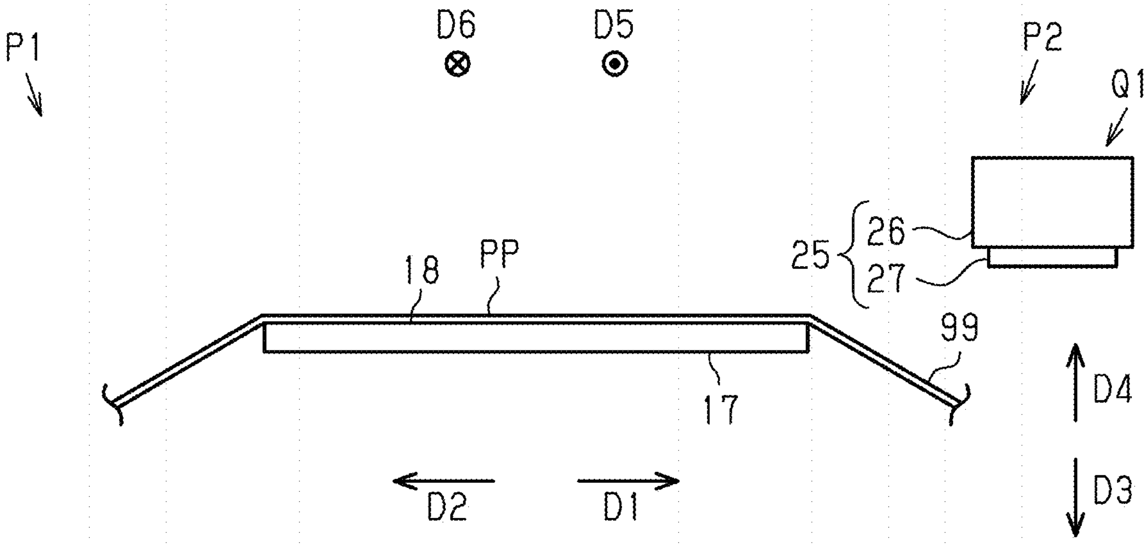
FIG. 12 is a side view when the carriage stands by at the second position in unidirectional printing, which prints in a return path.

Next, a case where the print section 25 performs printing in the return path will be described. As shown in FIG. 12, the control section 30 causes the carriage 26 to wait at a start position, for example, the second position P2 before printing starts. At this time, the carriage 26 is located at the approach position Q1. The control section 30 then moves the carriage 26 from the start position to the return position. In other words, the control section 30 moves the carriage 26 in the second direction D2 from the second position P2 toward the first position P1. By this, the carriage 26 and the head 27 move in the return path. At this time, the control section 30 starts the movement of the carriage 26 while the medium 99 is stopped.

Figure 13:
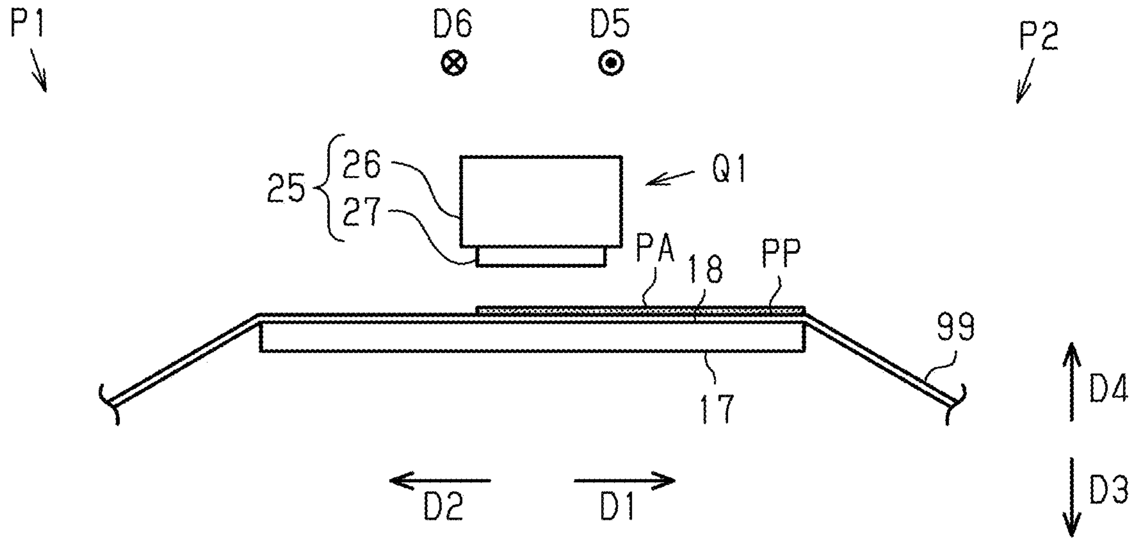
FIG. 13 is a side view during printing in unidirectional printing, which prints in the return path.

As shown in FIG. 13, the control section 30 causes the head 27 to eject liquid while the carriage 26 moves over above the print portion PP. By this, the print region PA is printed in the print portion PP. The control section 30 causes the head 27 to eject liquid while moving the carriage 26 with respect to the print portion PP.

Figure 14:
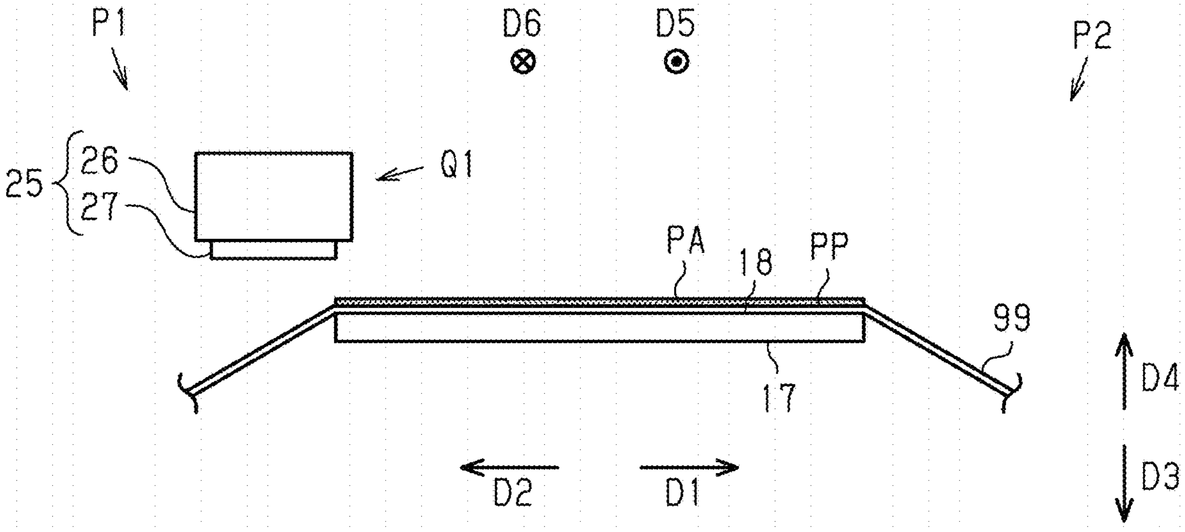
FIG. 14 is a side view after printing in unidirectional printing, which prints in the return path.
Figure 15:
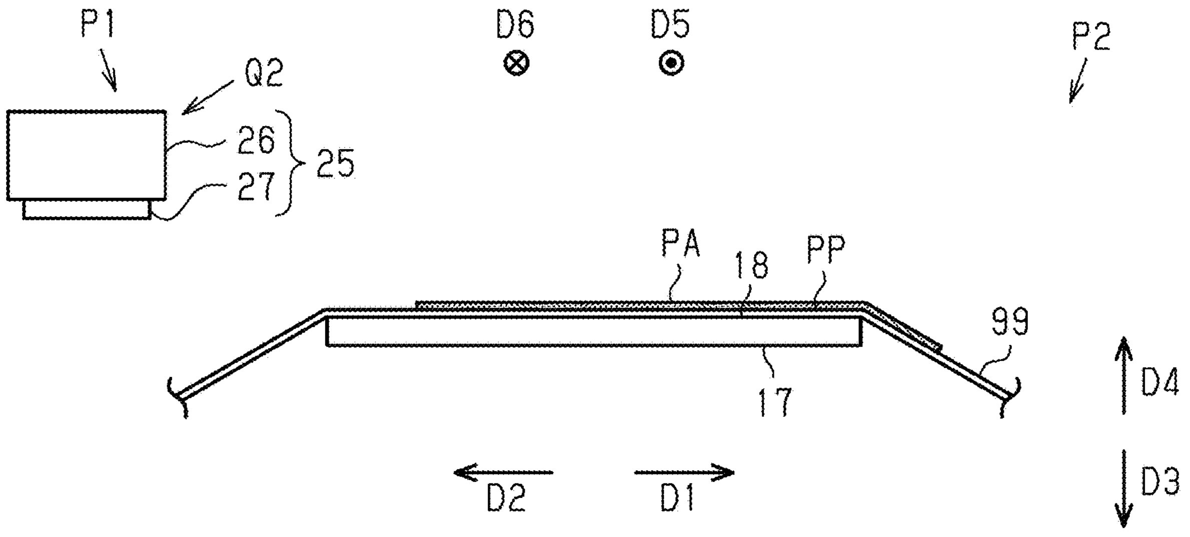
FIG. 15 is a side view when the carriage is located at the first position in unidirectional printing, which prints in the return path.

As shown in FIGS. 14 and 15, the control section 30 starts transport of the medium 99 by the transport section 22 after the print region PA has been formed in the print portion PP and before the carriage 26 that is moving in the second direction D2 stops. The control section 30 starts the transport of the medium 99 by the transport section 22, for example, after the ejection of liquid by the head 27 has been completed and before the carriage 26 reaches the first position P1. In other words, a time period during which the carriage 26 moves overlaps with a time period during which the medium 99 is transported. By this, productivity of the printing device 11 is improved compared to the case where the transport of the medium 99 starts after the carriage 26 has stopped.

The control section 30 may start the transport of the medium 99 by the transport section 22 after last liquid ejected by the head 27 has landed on the medium 99 and before the carriage 26 stops. The control section 30 may start the transport of the medium 99 by the transport section 22, for example, after a predetermined time has elapsed since the head 27 lastly ejected liquid and before the carriage 26 stops. The control section 30 may start the transport of the medium 99 by the transport section 22 after the last liquid ejected by the head 27 has landed on the medium 99, after the head 27 has passed a position where the last liquid landed on the medium 99, and before the carriage 26 stops. By this, it reduces concern that the print region PA and the head 27 may come into contact with each other.

The control section 30 may start the transport of the medium 99 by the transport section 22 after the head 27 has passed the print region PA and before the carriage 26 stops. Specifically, the control section 30 may start the transport of the medium 99 by the transport section 22, as viewed from a position facing the support surface 18, after the head 27 has passed the print region PA and before the carriage 26 stops. By this, for example, in a case where printing is performed in only a part of the print portion PP, it is possible to advance timing at which the transport of the medium 99 starts compared to a case where the transport by the transport section 22 starts after the head 27 has passed the print portion PP. Therefore, productivity of the printing device 11 is improved.

The control section 30 causes the carriage 26 to displace from the approach position Q1 to the retreat position Q2 after the print region PA has been formed in the print portion PP and before the head 27 overlaps the print region PA on the support section 17. In one example, the control section 30 causes the carriage 26 to displace from the approach position Q1 to the retreat position Q2 after the print region PA has been formed in the print portion PP and before the carriage 26 that is moving in the second direction D2 stops.

As shown in FIG. 15, the control section 30 stops the carriage 26 at the return position. Specifically, the control section 30 stops the carriage 26 that has reached the first position P1. At this time, the transport of the medium 99 is continued. Since the medium 99 is transported from below the support section 17 toward the support section 17, the medium 99 is less likely to come into contact with the head 27 that has passed above the support surface 18.

Figure 16:
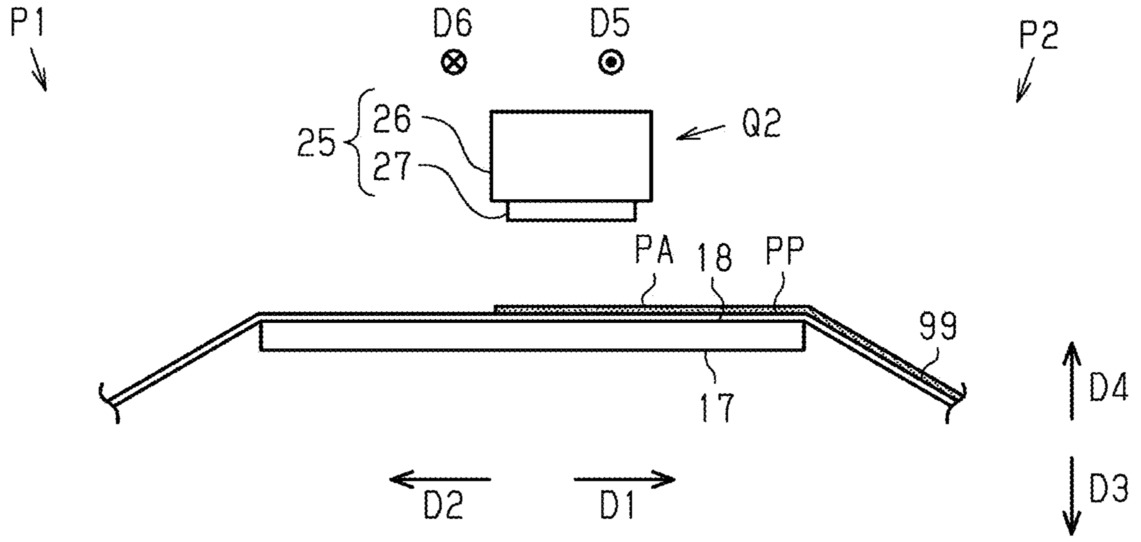
FIG. 16 is a side view when the carriage returns from the first position to the second position in unidirectional printing, which prints in the return path.

As shown in FIG. 16, the control section 30 starts movement of the carriage 26 in the first direction D1 before the transport of the medium 99 by the transport section 22 stops. In other words, the control section 30 causes the carriage 26 to start returning to the start position before the transport of the medium 99 by the transport section 22 stops. The control section 30 moves the carriage 26 in the first direction D1 from the first position P1 to the second position P2 before the transport of the medium 99 by the transport section 22 stops. At this time, the carriage 26 and the head 27 move in the forward path. By this, a time period during which the carriage 26 moves overlaps with a time period during which the medium 99 is transported. By this, productivity of the printing device 11 is improved compared to a case where the movement of the carriage 26 in the first direction D1 is started after the transport of the medium 99 by the transport section 22 has been completed.

The control section 30 moves the carriage 26 in the first direction D1 at a speed that is higher than the transport speed of the medium 99. By this, the head 27 may reach the print region PA on the support section 17. In other words, the head 27 may overlap with the print region PA on the support section 17. Also in this case, since the carriage 26 is located at the retreat position Q2, concern that the head 27 contacts the print region PA is small.

Figure 17:
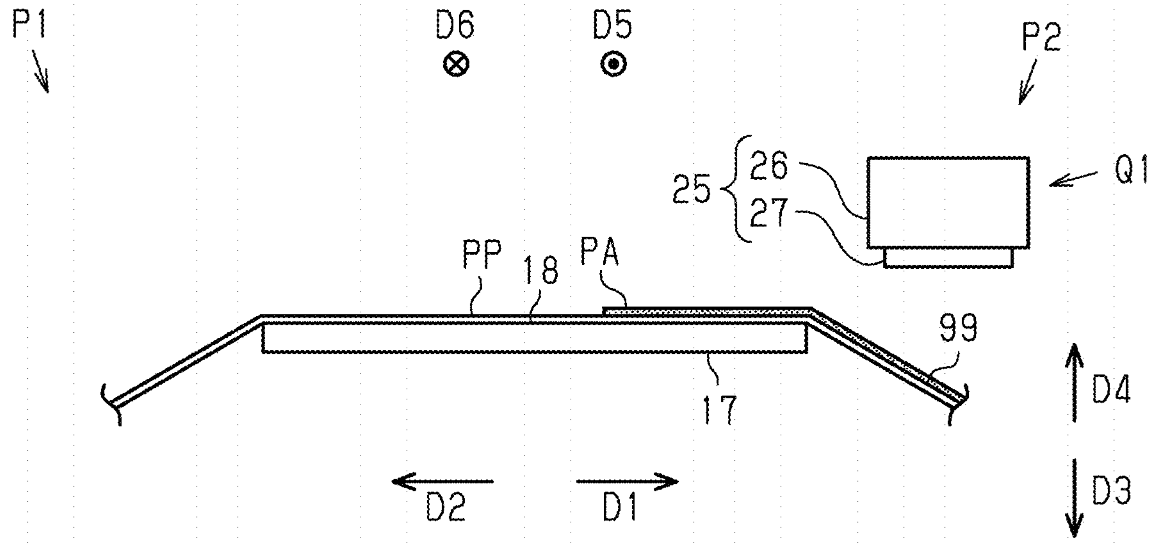
FIG. 17 is a side view when the head has passed above the support surface in unidirectional printing, which prints in the return path.

As shown in FIG. 17, the control section 30 causes the carriage 26 to displace from the retreat position Q2 to the approach position Q1 after the head 27 has passed above the support surface 18. For example, the control section 30 causes the carriage 26 to start moving in the third direction D3 after the head 27 has passed above the print region PA. In this case, the carriage 26 can be displaced to the approach position Q1 more quickly than when the carriage 26 is displaced from the retreat position Q2 to the approach position Q1 after the carriage 26 has been located at the second position P2.

Operations and Effects

Next, operations and effects of the above embodiments will be described.

(1) The control section 30 causes the carriage 26 to displace from the approach position Q1 to the retreat position Q2 after the print region PA has been formed in the print portion PP and before the head 27 overlaps the print region PA on the support section 17. According to the above configuration, a time period during which the transport section 22 transports the medium 99 overlaps with a time period during which the carriage 26 scans. Therefore, productivity is improved. In addition, the head 27 passes above the print region PA in a state where the carriage 26 is located at the retreat position Q2. Thus, concern that the head 27 comes into contact with the print region PA is reduced. Therefore, it is possible to suppress deterioration of print quality while improving productivity.

(2) The control section 30 causes the carriage 26 to displace from the approach position Q1 to the retreat position Q2 after the print region PA has been formed in the print portion PP and before the carriage 26 stops. According to the above configuration, the carriage 26 is displaced to the retreat position Q2 at a relatively early stage. Thus, concern that the head 27 comes into contact with the print region PA is reduced.

(3) The movement speed of the carriage 26 when it is located at the retreat position Q2 is faster than the transport speed at which the medium 99 is transported by the transport section 22. In a state in which the carriage 26 is located at the retreat position Q2, the head 27 is less likely to contact the print region PA. Therefore, even if the movement speed of the carriage 26 is fast, concern that the head 27 contacts the print region PA is small. Therefore, to the above according configuration, productivity is improved.

(4) The control section 30 performs unidirectional printing on the medium 99 by controlling the head 27 and the carriage 26. The control section 30 causes the head 27 to eject liquid when the carriage 26 moves in the forward path. According to the above configuration, in a case where the head 27 ejects liquid in the forward path in unidirectional printing, productivity is improved.

(5) The control section 30 performs unidirectional printing on the medium 99 by controlling the head 27 and the carriage 26. The control section 30 causes the head 27 to eject liquid when the carriage 26 moves in the return path. According to the above configuration, in a case where the head 27 ejects liquid in the return path in unidirectional printing, productivity is improved.

(6) The control section 30 causes the carriage 26 to displace from the retreat position Q2 to the approach position Q1 after the carriage 26 has been displaced to the retreat position Q2 and after the head 27 has passed above the print region PA. According to the above configuration, the carriage 26 can be displaced to the approach position Q1 at an earlier timing compared to the case where the carriage 26 is displaced after it has passed above the support surface 18.

(7) The control section 30 causes the carriage 26 to displace from the retreat position Q2 to the approach position Q1 after the carriage 26 has been displaced to the retreat position Q2 and after the head 27 has passed over the support surface 18. According to the above configuration, concern that the head 27 comes into contact with the print region PA is reduced.

Modifications

The above described embodiments may be modified as follows. The above described embodiments and the following modifications can be implemented in combination with each other to the extent that they are not technically contradictory.

The liquid ejected by the head 27 is not limited to ink, and may be, for example, a liquid form material in which particles of a functional material are dispersed or mixed in a liquid. For example, the head 27 may eject a liquid form material containing a material such as an electrode material or a pixel material used for manufacturing a liquid crystal display, an electroluminescent display, a surface emitting display, or the like in a dispersed or dissolved form.

Technical Ideas

Hereinafter, technical ideas grasped from the above embodiments and modifications, and operations and effects thereof, will be described.

(A) The printing device includes a transport section that intermittently transports a medium; a support section having a support surface that supports the medium; a head that prints by ejecting liquid onto a medium supported by the support section while transport of the medium by the transport section is stopped; a carriage on which the head is mounted; and a control section, wherein the carriage scans with respect to the medium by moving in one direction and in an opposite direction, which is opposite to the one direction and is configured to displace to an approach position and a retreat position by moving in a direction perpendicular to the support surface, the approach position is a position at which the head ejects liquid onto the medium, the retreat position is a position where a distance between the head and the support surface is larger than that of when the head is located at the approach position, the head forms a print region on the medium by ejecting liquid onto a print portion of the medium that is located on the support surface, and the control section forms the print region in the print portion by causing the head to eject liquid while moving the carriage in the one direction, starts, after the print region was formed in the print portion and before the carriage that is moving in the one direction stops, transport of the medium by the transport section, starts, before the transport section completes the transport of the medium, movement of the carriage in the opposite direction, and causes the carriage to, after the print region was formed in the print portion and before the head overlaps the print region on the support section, displace from the approach position to the retreat position. According to the above configuration, a time period in which the transport section transports the medium and a time period in which the carriage scans overlap. Therefore, productivity is improved. Further, the head passes above the print region in a state where the carriage is located at the retreat position. Thus, concern that the head comes into contact with the print region is reduced. Therefore, it is possible to suppress deterioration of print quality while improving productivity.

(B) The above printing device may be configured such that the control section causes the carriage to displace, after the print region was formed in the print portion and before the carriage that is moving in the one direction stops, from the approach position to the retreat position. According to the above configuration, the carriage is displaced to the retreat position at a relatively early stage. Thus, concern that the head comes into contact with the print region is reduced.

(C) The above printing device may be configured such that a movement speed of the carriage in a state of being located at the retreat position is faster than a transport speed of the medium by the transport section. When the carriage is located at the retreat position, it is difficult for the head to come into contact with the print region. Therefore, even if the movement speed of the carriage is high, concern that the head comes into contact with the print region is small. Therefore, according to the above configuration, productivity is improved.

(D) The above printing device may be configured such that the control section performs unidirectional printing on the medium by controlling the head and the carriage and causes the head to eject liquid when the carriage moves in a forward path. According to the above configuration, productivity is improved in a case where the head ejects liquid in the forward path in unidirectional printing.

(E) The above printing device may be configured such that the control section performs unidirectional printing on the medium by controlling the head and the carriage and causes the head to eject liquid when the carriage moves in a return path. According to the above configuration, productivity is improved in a case where the head ejects liquid in the return path in unidirectional printing.

(F) The above printing device may be configured such that the control section causes the carriage to displace, after causing the carriage to displace to the retreat position and after the head passed above the print region, from the retreat position to the approach position. According to the above configuration, the carriage can be displaced to the approach position at an earlier timing than when it is displaced after passing above the support surface.

(G) The above printing device may be configured such that the control section causes the carriage to displace, after causing the carriage to displace to the retreat position and after the head passed above the support surface, from the retreat position to the approach position. According to the above configuration, concern that the head comes into contact with the print region is reduced.

(H) The printing method includes forming a print region in a print portion of a medium that is located on a support surface of a support section by causing a head to eject liquid while moving a carriage in one direction; starting transport of the medium after the print region was formed in the print portion and before the carriage that is moving in the one direction stops; starting, before completion of the transport of the medium, movement of the carriage in an opposite direction, which is opposite to the one direction; and causing the carriage to displace, after the print region was formed in the print portion and before the head overlaps the print region on the support section, from an approach position to a retreat position by moving the carriage in a direction perpendicular to the support surface, wherein compared to when the carriage is located at the approach position, a distance between the head and the support surface is greater in the retreat position. According to the above method, the same effects as those of the printing device described above can be obtained.

What is claimed is:

1. A printing device comprising:
- a transport section that intermittently transports a medium;
- a support section having a support surface that supports the medium;
- a head that prints by ejecting liquid onto a medium supported by the support section while transport of the medium by the transport section is stopped;
- a carriage on which the head is mounted; and
- a control section, wherein
- the carriage
  - scans with respect to the medium by moving in one direction and in an opposite direction, which is opposite to the one direction and
  - is configured to displace to an approach position and a retreat position by moving in a direction perpendicular to the support surface,
- the approach position is a position at which the head ejects liquid onto the medium,
- the retreat position is a position where a distance between the head and the support surface is larger than that of when the head is located at the approach position,
- the head forms a print region on the medium by ejecting liquid onto a print portion of the medium that is located on the support surface, and
- the control section
  - forms the print region in the print portion by causing the head to eject liquid while moving the carriage in the one direction,
  - starts, after the print region was formed in the print portion and before the carriage that is moving in the one direction stops, transport of the medium by the transport section,
  - starts, before the transport section completes the transport of the medium, movement of the carriage in the opposite direction, and
  - causes the carriage to, after the print region was formed in the print portion and before the head overlaps the print region on the support section, displace from the approach position to the retreat position.

2. The printing device according to claim 1, wherein the control section causes the carriage to displace, after the print region was formed in the print portion and before the carriage that is moving in the one direction stops, from the approach position to the retreat position.

3. The printing device according to claim 1, wherein a movement speed of the carriage in a state of being located at the retreat position is faster than a transport speed of the medium by the transport section.

4. The printing device according to claim 1, wherein the control section
- performs unidirectional printing on the medium by controlling the head and the carriage and
- causes the head to eject liquid when the carriage moves in a forward path.

5. The printing device according to claim 1, wherein the control section performs unidirectional printing on the medium by controlling the head and the carriage and causes the head to eject liquid when the carriage moves in a return path.

6. The printing device according to claim 4, wherein the control section causes the carriage to displace, after causing the carriage to displace to the retreat position and after the head passed above the print region, from the retreat position to the approach position.

7. The printing device according to claim 5, wherein the control section causes the carriage to displace, after causing the carriage to displace to the retreat position and after the head passed above the support surface, from the retreat position to the approach position.

8. A printing method comprising:

forming a print region in a print portion of a medium that is located on a support surface of a support section by causing a head to eject liquid while moving a carriage in one direction;

starting transport of the medium after the print region was formed in the print portion and before the carriage that is moving in the one direction stops;

starting, before completion of the transport of the medium, movement of the carriage in an opposite direction, which is opposite to the one direction; and causing the carriage to displace, after the print region was formed in the print portion and before the head overlaps the print region on the support section, from an approach position to a retreat position by moving the carriage in a direction perpendicular to the support surface, wherein compared to when the carriage is located at the approach position, a distance between the head and the support surface is greater in the retreat position.

* * * * *